United States Patent [19]

Engeler et al.

[11] Patent Number: 5,832,923
[45] Date of Patent: Nov. 10, 1998

[54] UTRASOUND IMAGING SYSTEM ARCHITECTURE EMPLOYING SWITCHED TRANSDUCER ELEMENTS

[75] Inventors: William Ernest Engeler, Scotia; Peter William Lorraine, Niskayuna, both of N.Y.; John Thomas Pedicone, Winter Springs, Fla.

[73] Assignee: General Electric Company, Schenectady, N.Y.

[21] Appl. No.: 763,772

[22] Filed: Dec. 11, 1996

[51] Int. Cl.⁶ ..................................................... A61B 8/00
[52] U.S. Cl. ....................................... 128/661.01; 73/626
[58] Field of Search ..................... 128/661.01, 660.01, 128/660.07, 660.08; 73/626

[56] References Cited

U.S. PATENT DOCUMENTS

| | | | |
|---|---|---|---|
| 5,117,238 | 5/1992 | Silverstein et al. | 342/373 |
| 5,186,175 | 2/1993 | Hirama et al. | 128/661.01 |
| 5,229,933 | 7/1993 | Larson, III | 364/413.26 |
| 5,465,722 | 11/1995 | Fort et al. | 128/661.01 |
| 5,477,859 | 12/1995 | Engeler | 128/661.01 |
| 5,517,996 | 5/1996 | Okada et al. | 128/661.01 |
| 5,520,186 | 5/1996 | Deitrich | 128/661.01 |

OTHER PUBLICATIONS

"An Acoustic Phase Plate Imaging Device", Farnow et al., Acoustical Holography, vol. 6, Newell Booth, Editor, Plenum Press, New York (1975), pp. 259–273.

"Fast Beam–Forming Algorithm", J.R. Williams, J. Acous. Soc. America, vol. 44, No. 5, 1454–1455 (1968).

"Parallel Architectures for Multirate Superresolution Spectrum Analyzers", Silverstein et al., IEEE Trans. Circuits and Systems, vol. 38, No. 4, 449–453 (1991).

Primary Examiner—Francis Jaworski
Attorney, Agent, or Firm—Marvin Snyder

[57] ABSTRACT

An ultrasonic imaging system which uses transform beam-forming in a two-dimensional context includes a two-dimensional array of transducer elements, a plurality of groups of local busses, and a plurality of sets of switching circuits. Each transducer element has a signal electrode coupled to a corresponding set of switching circuits which is controlled so that a particular transducer element is selectively coupled to one of the associated group of local busses. Each local bus provides an output signal that is sent from the probe to the console via a respective coaxial cable for each group of local busses. The number of connections that are necessary to be made through each coaxial cable is reduced by the ratio of the number of transducer elements coupled to a set of local busses and the number of busses in that set. Each set of local busses provides the input transform signals to one transform section of the transform preprocessor. A control signal stored in memory determines which local bus each transducer is operatively connected to. The code pattern of the memory therefore specifies the patterns of the transducer element connections to the coaxial cables.

16 Claims, 10 Drawing Sheets

UTRASOUND IMAGING SYSTEM ARCHITECTURE EMPLOYING SWITCHED TRANSDUCER ELEMENTS

FIELD OF THE INVENTION

This invention relates to medical ultrasound imaging systems in which the number of transducer elements is greater than the number of beamforming channels.

BACKGROUND OF THE INVENTION

Conventional ultrasound imaging systems comprise an array of ultrasonic transducer elements which are used to transmit an ultrasound beam and then receive the reflected beam from the object being studied. For ultrasound imaging, the array typically has a multiplicity of transducer elements arranged in a line and driven with separate voltages. By selecting the time delay (or phase) and amplitude of the applied voltages, the individual transducer elements can be controlled to produce ultrasonic waves which combine to form a net ultrasonic wave that travels along a preferred vector direction and is focused at a selected point along the beam. Multiple firings may be used to acquire data representing the same anatomical information. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. By changing the time delay and amplitude of the applied voltages, the beam with its focal point can be moved in a plane to scan the object.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal each receiving transducer element.

Such scanning comprises a series of measurements in which the steered ultrasonic wave is transmitted, the system switches to receive mode after a short time interval, and the reflected ultrasonic wave is received and stored. Typically, transmission and reception are steered in the same direction during each measurement to acquire data from a series of points along an acoustic beam or scan line. The receiver is dynamically focused at a succession of ranges along the scan line as the reflected ultrasonic waves are received.

Ultrasonic imaging systems are known in which each transducer element is served by an individual analog channel followed by an analog-to-digital converter and one delay chip. Thus, a 128-channel system requires 128 delay chips and all of their associated memory and bus components.

In some ultrasound imaging systems, the number of transducer elements is greater than the number of time delay channels. For example, a system having a 256-segment transducer and a 128-channel beamformer is known. That system requires multiple firings and multiplexing of the transducer signals to provide this expanded function. Repeated firings, however, limit the applicability of this technique to relatively modest increases.

With 1.5-dimensional and two-dimensional arrays soon to be introduced, systems that are capable of a large number of effective channels are required. This must be done without a concomitant increase in the power and cost budget. An architectural concept that can achieve these results without the use of multiple firings is required.

An ultrasonic imaging system which utilizes a two-stage beamforming architecture consisting of a fixed wideband preprocessor section followed by a reduced number of dynamically adjusted delay chips has previously been proposed. In accordance with this proposed architecture, the preprocessor comprises a transform beamformer with spatial filtering followed by a delay beamformer. The proposed system employs sets of local transforms each serving a relatively few channels. Each transform preprocessor provides a transformation of the local array space data into beam space. One or combinations of these beams may then be selected and used as inputs to an inverse transform. This second transform converts the beam space data back into array space data. This reestablishes the spatial array, but this time with a reduced directional view. Because these data are restricted in direction, an inverse transform of reduced size may be used for the reconstruction. This is equivalent to a filtering and decimation process. The result is a decrease in the number of channels required by the remainder of the beamformer.

The reduced number of channels is processed just as in the conventional digital baseband imaging system with one delay chip per channel. The final delay processor provides the wide bandwidth delay necessary to combine the set of individual transforms into one total beam and also provides all of the associated beamforming features, such as dynamic focusing and apodization.

Figure 1:
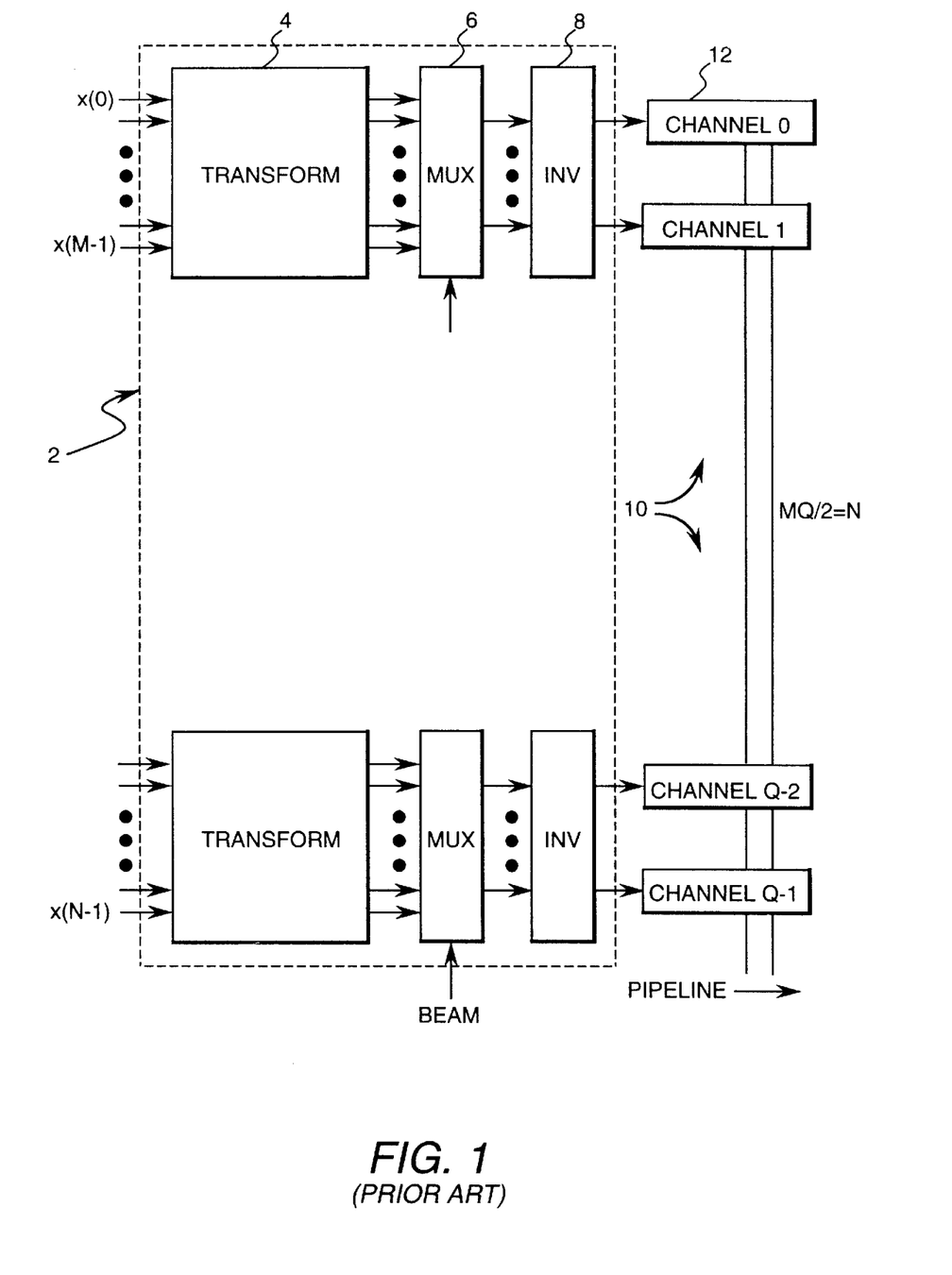
FIGS. 1 and 2 are block diagrams of previously proposed transform preprocessor architectures.

FIG. 1 shows a schematic of a system employing a preprocessor section 2 to reduce the channel count of an imaging system. In this system the input signals are grouped into groups of M signals each. These signals are applied to the inputs of individual transform preprocessor sections 4 which form beams in the desired directions. Signals representing beam directions selected by multiplexers 6 are inverted by inverse transforms 8 to generate a reduced set of spatial preprocessor output signals. The number of channels 12 required in the delay processor 10 is therefore reduced by the ratio of M to the number of output signals of preprocessor 2.

The amount of reduction achieved by the preprocessor depends on the ratio of the order of the input transform to that of the output inverse transform. In the limit, where only a single beam direction is sent to the inverse transform, the beam selection and inverse transform become just a wire. In such system only one beam direction needs to be calculated during each firing of the transducer, as only one is used. The reduction factor then becomes the size of the input transform M.

The resulting reduced channels of data are processed just as in the conventional imaging system. The final delay processor 10 provides the wide bandwidth delay necessary to connect the set of individual transforms into one total beam. If the phase shifts specified by the transform are provided as real delays, not simply phase delays, the full wide bandwidth nature of the system is maintained.

Figure 2:
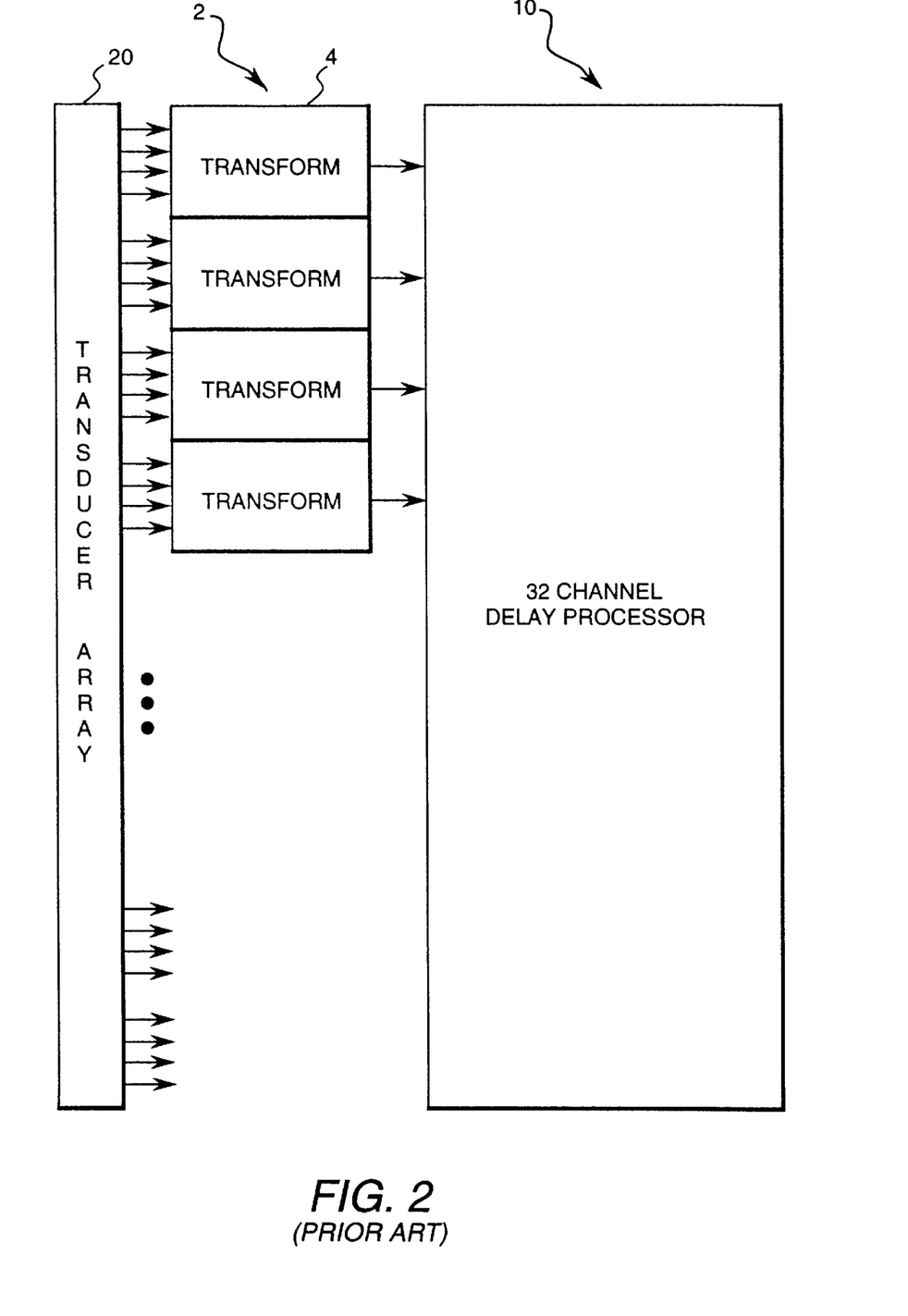

FIG. 2 shows an imager of this type wherein each transform preprocessor section 4 has four inputs from the transducer array 20 and one output, i.e., M=4. A single conductor connects the four-input preprocessor sections 4 to the delay processor or beamformer 10. Therefore, the delay processor of an imaging system having 128 transducer elements requires only 32 delay channels. This structure is sensitive to a mismatch between the beam direction specified in the preprocessor section and that specified in the channel delay section. When the error occurs, additional unwanted beams are formed at angles of 45° to the desired direction. This becomes a particularly troublesome problem when dynamic focus modifications alter the direction of the next channel delay beam during beam observation time.

Figure 3:
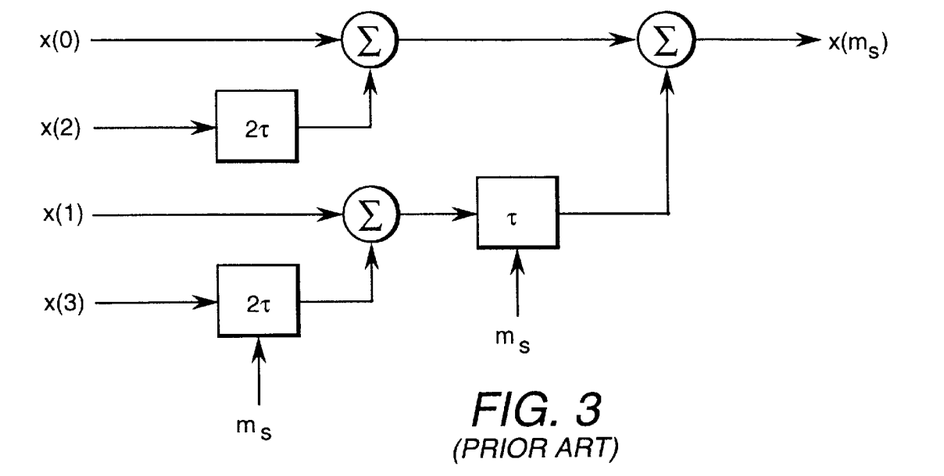
FIG. 3 is a block diagram of a transform preprocessor structure having four inputs and a single beam direction output (i.e., M=4) in accordance with one preferred embodiment of the previously proposed architecture.

FIG. 3 shows an M=4 transform preprocessor structure that generates a single beam direction output. Each time delay τ represents a 0 or ±90° phase shift, depending on the desired value of $m_s$. This structure generates a desired output signal $X(m_s)$, where $m_s$ is −1, 0, 1 or 2. The structure, however, is not limited to $m_s$ being an integer value if intermediate values of delay are provided.

The quantization of the preprocessor must be in steps corresponding to the full array, not in steps corresponding to the preprocessor size. The preprocessor must therefore have N rather than M directions. With a preprocessor capable of N directions, the system of FIG. 2 can form the full set of beam directions $k_s$. To accomplish this, the structure of FIG. 3 is used with τ set to the appropriate value as a function of the input parameter $m_s$.

Even though the beamformer and the preprocessor are set to the same direction at the start of the beam, with time this will no longer be true. The direction of the final delay beamformer changes with time as the action of the dynamic focusing comes into play. This causes a shift comparable to a change of four steps in the value of $k_s$. This offset between the directions at which the preprocessor and the final delay processor are steered produces a spurious beam.

The offset error caused by dynamic focusing in the delay processor can be corrected by supplying weighted portions of adjacent transducer element output signals to each preprocessor section. The remainder of the output signals from such adjacent transducer elements, i.e., the original output signal minus any weighted portions added to other preprocessor sections, are used in their respective preprocessor sections. This preprocessor structure forms a spatial filter which limits sensitivity of the beamformer to beam steering errors between the preprocessor and the channel delay processors.

Figure 4:
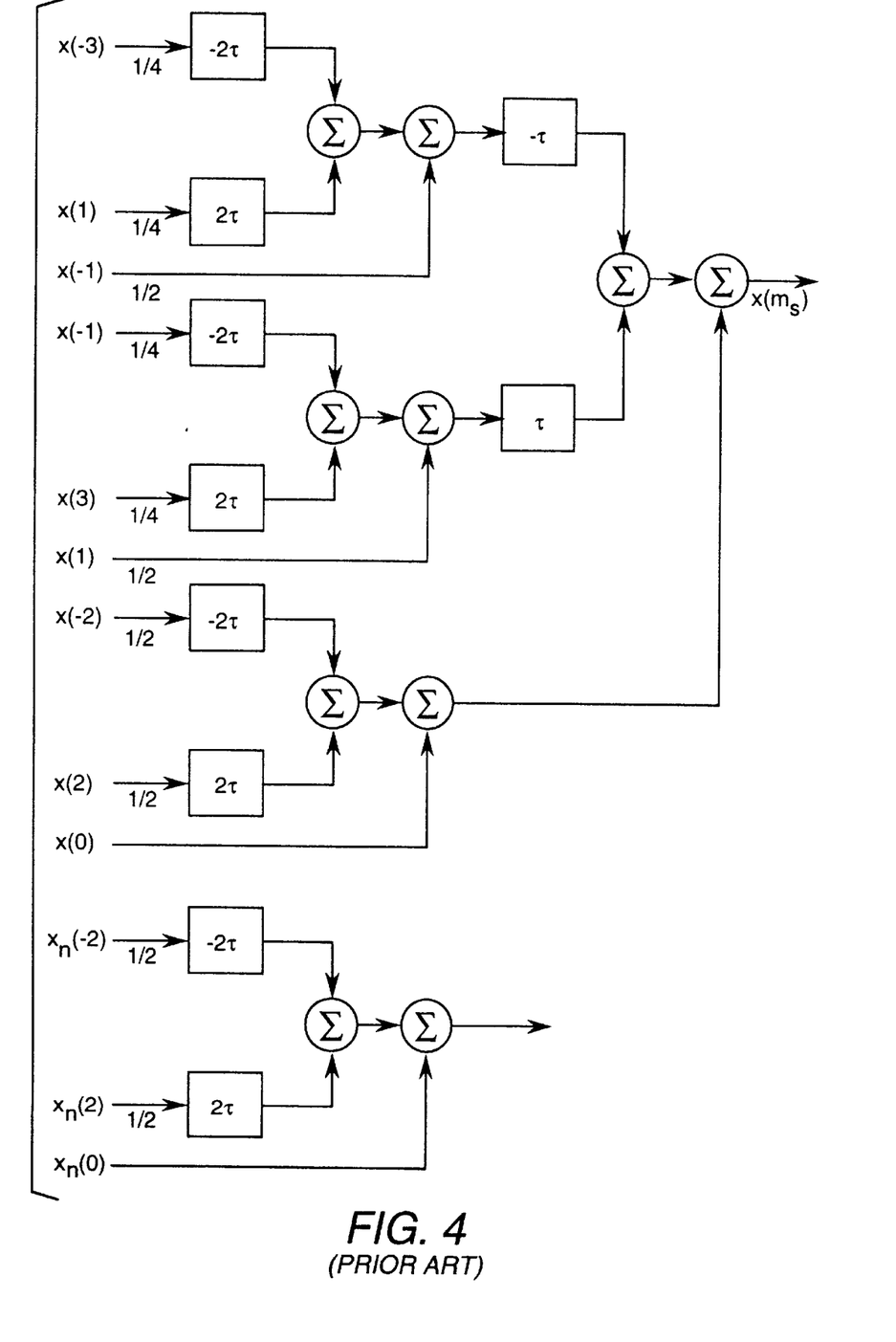
FIG. 4 is a block diagram of a 7-element balanced M=4 spatial filtering preprocessor which limits the sensitivity of the beamformer to beam steering errors between the preprocessor and the channel delay processors.

M=4 structures will produce spurious signals spaced from $k_s$ by steps of N/4. These spurious signals may be substantially reduced by forming a fully balanced spatial filter structure such as shown in FIG. 4. This filter structure uses the input signals from seven adjacent transducer elements to provide the fully balanced preprocessor function. By including three adjacent signals in addition to the four input signals of the group, a spatial filter is formed that is insensitive to steering angle offset error. This allows dynamic focusing delay changes to be made while still maintaining fixed the delays of the preprocessor.

In accordance with the embodiment of FIG. 4, the weighting factor is unity for the output signal x(0) from the center element of the seven adjacent transducer elements. The output signals x(1) and x(−1) from the elements adjacent to the center element are divided into three separate output signals using respective weighting factors of ½, ¼ and ¼. The last of the three separate output signals does not appear in FIG. 4 because it is supplied to the next adjacent preprocessor section (not shown). The output signals x(2) and x(−2) from the elements which are two elements away from the center element are divided into two separate output signals using respective weighting factors of ½ and ½. The second of the two separate output signals is supplied to the next adjacent preprocessor section. Finally, the output signals x(3) and x(−3) from the elements which are three elements away from the center element are divided into three separate output signals using respective weighting factors of ½, ¼ and ¼. The last of the three separate output signals is supplied to the preprocessor section shown in FIG. 4, while the other two output signals are supplied to the next adjacent preprocessor section. The transform output signal $X(m_s)$ is a summation of these input signals with appropriate delays.

Each delay in the balanced filter structure of FIG. 4 is balanced by its negative. In a real system, however, it is not possible to implement a negative delay. This problem is solved in the usual way by providing a fixed delay and adding or subtracting from that value. The fixed delay is chosen to be large enough so that no result is negative.

In general, M−1 additional adjacent signals are added into each preprocessor section. These same signals are also used in their respective sections. This does not cause an increase in the number of total transducer sections except at the ends of the array. Both of the balanced filters for M=2 and for M=4 require additional input signals to satisfy the end effects of the filters. Because of this, the array length N is given by MQ+M−1, where Q is the number of channels required in the final delay processor. For M=2, one additional input signal is needed, while for M=4, three additional input signals are needed.

Figure 5:
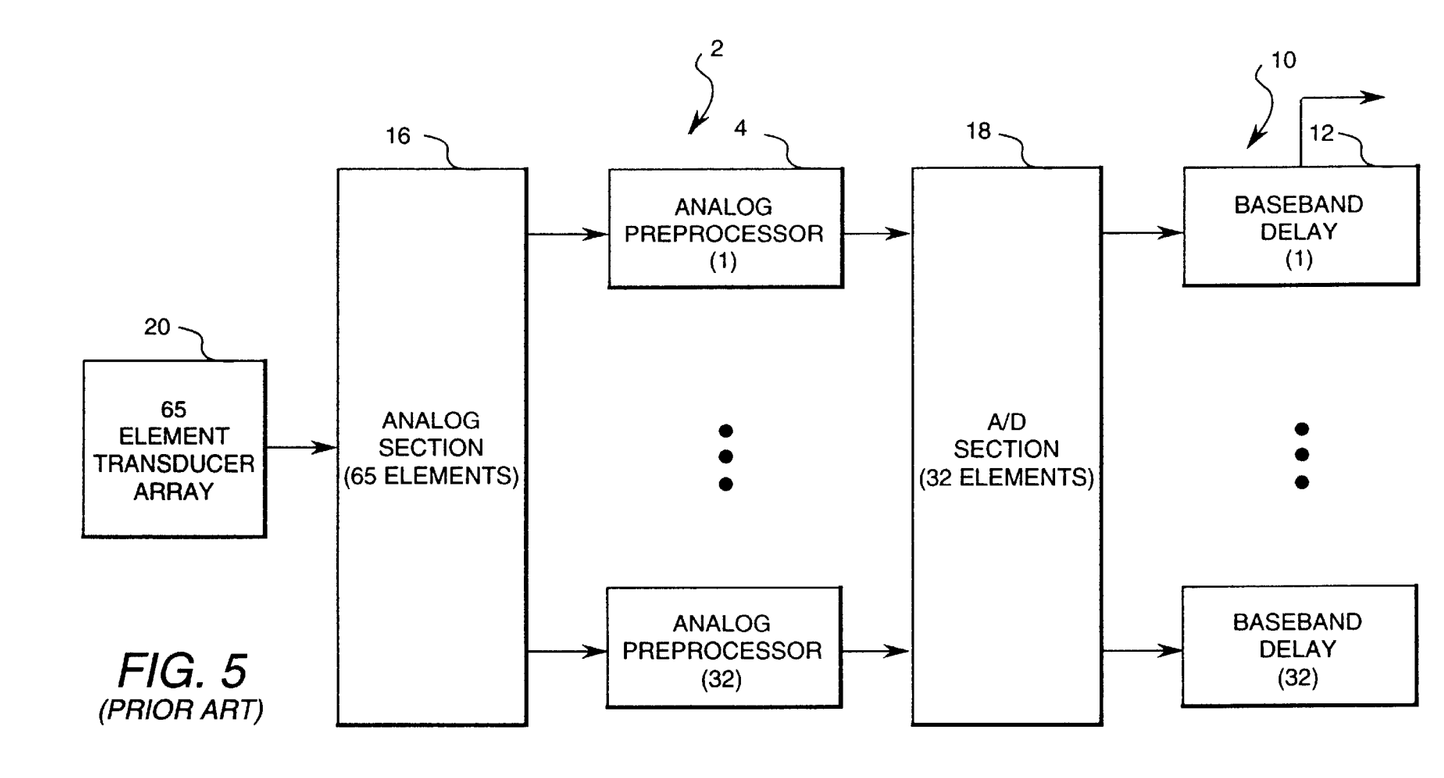
FIG. 5 is a block diagram of a transform beamforming system having a 65-element transducer and 32 delay channels.

Using the above-described architecture, an economy beamforming system may be fabricated with reduced channel count, as compared to conventional ultrasound imaging systems. An economy system having a 65-element transducer 20 and a 32-channel delay processor 10 is shown in FIG. 5. In the economy system of FIG. 5, an analog implementation of the preprocessor is used, and M=2. This requires 32 analog preprocessor delay stages 4 coupled to the analog section 16 and results in a saving of half of the analog-to-digital (A/D) converter 18 and its associated filter requirements and half of the digital beamforming section. The beamformer of such system is roughly one third the size of a conventional imaging system.

An alternative architecture (not shown) interchanges the positions of the A/D and preprocessor sections. In this alternative, the number of A/D converters is increased to 35, but the number of preprocessors remains the same. This configuration allows the preprocessor to be implemented digitally.

Figure 6:
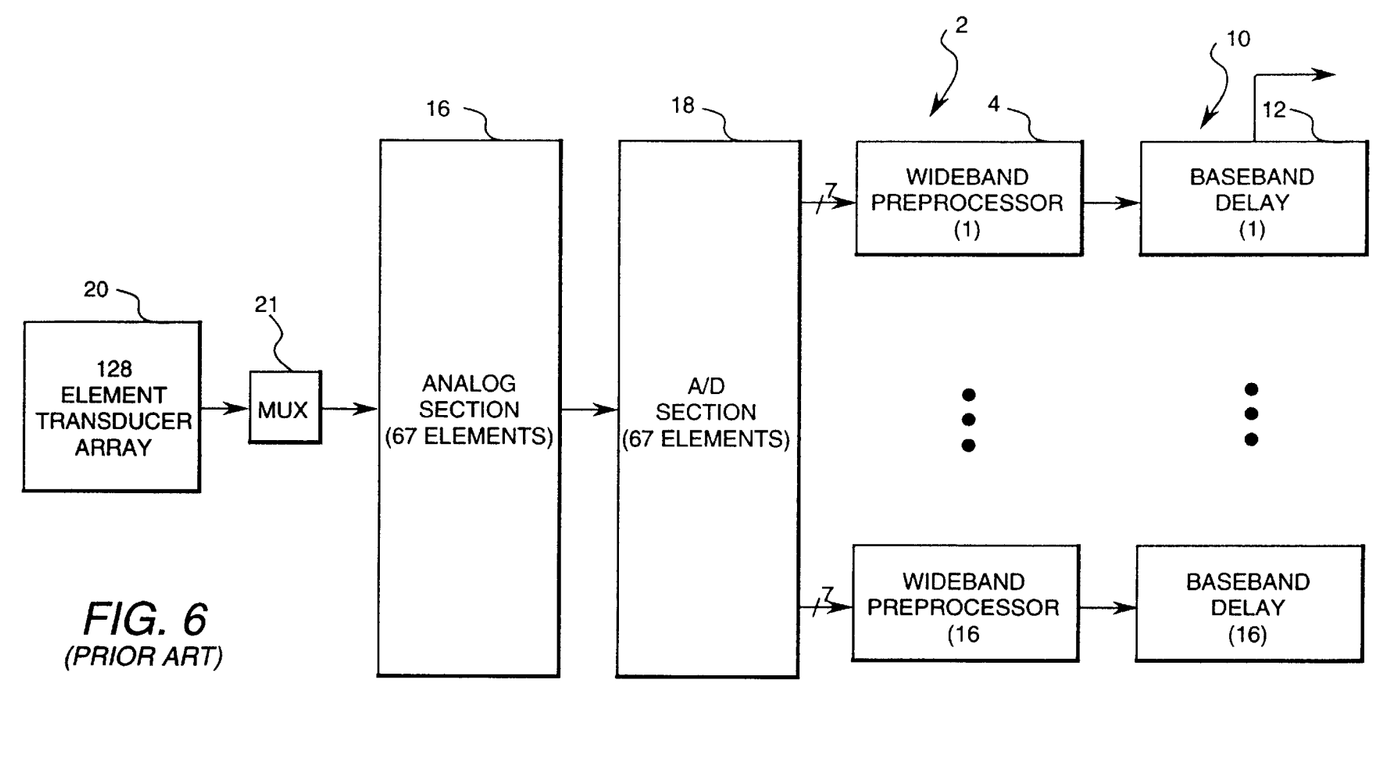
FIG. 6 is a block diagram of a transform beam-forming system having a 128-element transducer and 67 delay channels.

An alternative economy system having a 128-element transducer 20 and a 16-channel delay processor 10 is shown in FIG. 6. The number of receive channels used on each firing is expanded from 64 to 67 to take care of the end effect channels of the preprocessor architecture. The 67 transducer elements are selected by a multiplexer 21 from the full-width array of 128 elements. These are processed by 67 analog channels leading up to the A/D converters. The output signals of these converters are supplied, respectively, to 16 digital preprocessor balanced spatial filter integrated circuits of the type described above. The output signals of these chips are supplied, respectively to 16 time delay integrated circuits 12 to complete the beamforming. The transmit outputs of the 16 preprocessor integrated circuits also provide the necessary transmit timing signals for the transducer firing sequence. A system of this type can be accommodated on a total of four beamforming boards.

Thus a two-stage ultrasonic imaging beamformer can be built with significant savings in hardware compared to the usual single-stage beamformer. The first stage combines signals in each of four channels into a single output signal that is processed by a delay chip of conventional design. If these channels are simply combined, any error in the array delays will cause spurious beams to be formed. By forming a spatial filter that combines the signals in the four selected channels along with signals in adjacent channels, this problem is greatly reduced. This enables systems to be built wherein the first or preprocessor stage has a fixed delay during the computation of each beam. All dynamic processing is performed in the second or final delay stage.

SUMMARY OF THE INVENTION

In addition to the above-described economy systems, a preprocessor which performs spatial filtering may also be used to advantage in 1.5-dimensional and two-dimensional systems. The present invention is an improved ultrasound imaging system which uses transform beamforming in a two-dimensional context. The imaging system in accordance with the invention comprises a plurality of transducer elements, a plurality of groups of local busses, and a plurality of sets of switching circuits. Each transducer element has a ground electrode coupled to a common ground and a signal electrode coupled to a corresponding set of switching circuits. The corresponding set of switching circuits is controlled so that the output signal from the signal electrode of a particular transducer element is selectively provided to one of the respective group of local busses. Each local bus provides an output signal that is sent from the probe to the console via a respective coaxial cable for each group of local busses.

In accordance with the present invention, the number of connections that are necessary to be made through each coaxial cable is reduced by the ratio of the number of transducer elements coupled to a set of local busses and the number of busses in that set. Each set of N local busses forms the input transform signals to one transform block of the transform preprocessor. Buffers are optionally incorporated to improve transmission of the data from the probe to the console in which the transform preprocessor and delay beamformer are housed. All delay elements are located in the console.

Each transducer within the transform set may be operatively coupled to one of its associated local busses. Which open connection is made is determined by a control signal stored in memory. The code pattern of the memory therefore specifies the patterns of the transducer element open connections to the coaxial cables. In effect, the memory pattern determines to which of the local busses each transducer element contributes its signal. The pattern stored in the local control memory is therefore able to specify the direction of the spatial transform of each local region of the transducer array.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE PREFERRED EMBODIMENTS

Figure 7A:
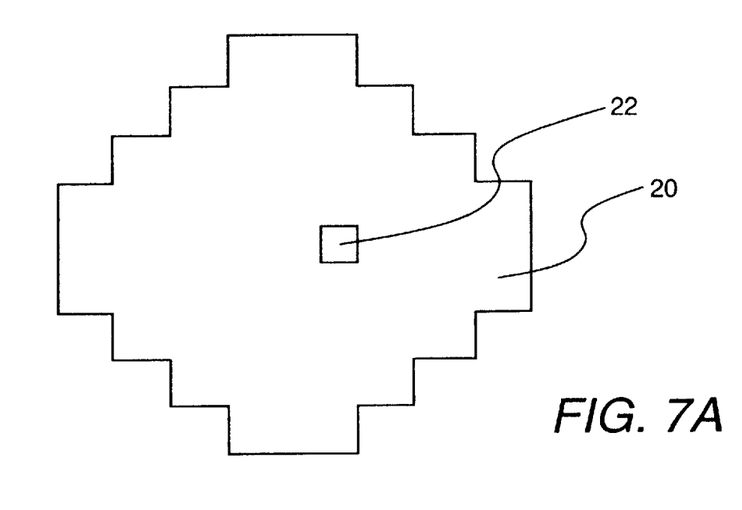
FIG. 7A is a schematic plan view of a 912-element ultrasound transducer array in accordance with the present invention.
Figure 7B:
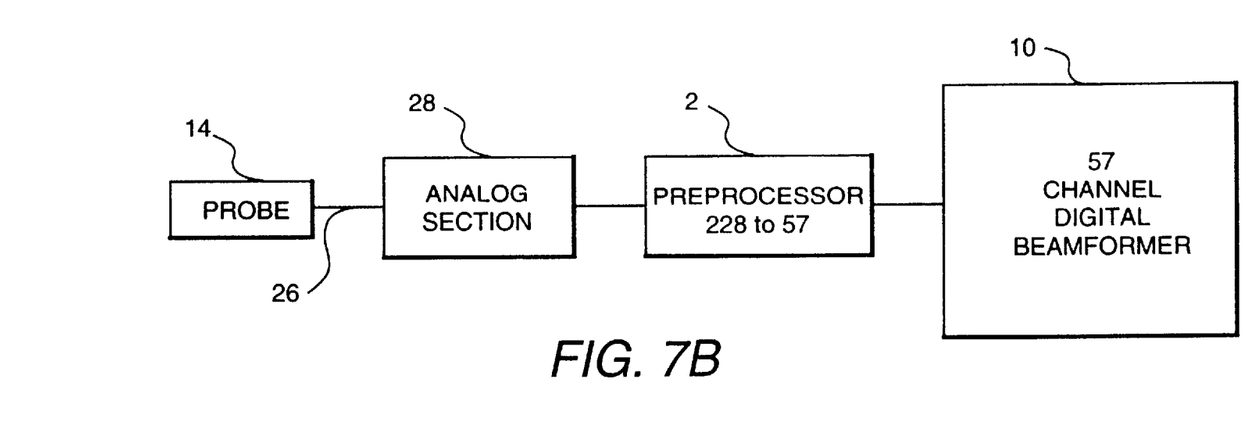
FIG. 7B is a block diagram of a transform beam-forming system having an ultrasound probe with 912 transducer elements arranged as shown in FIG. 7A, and 57 delay channels in accordance with a preferred embodiment of the invention.
Figure 7C:
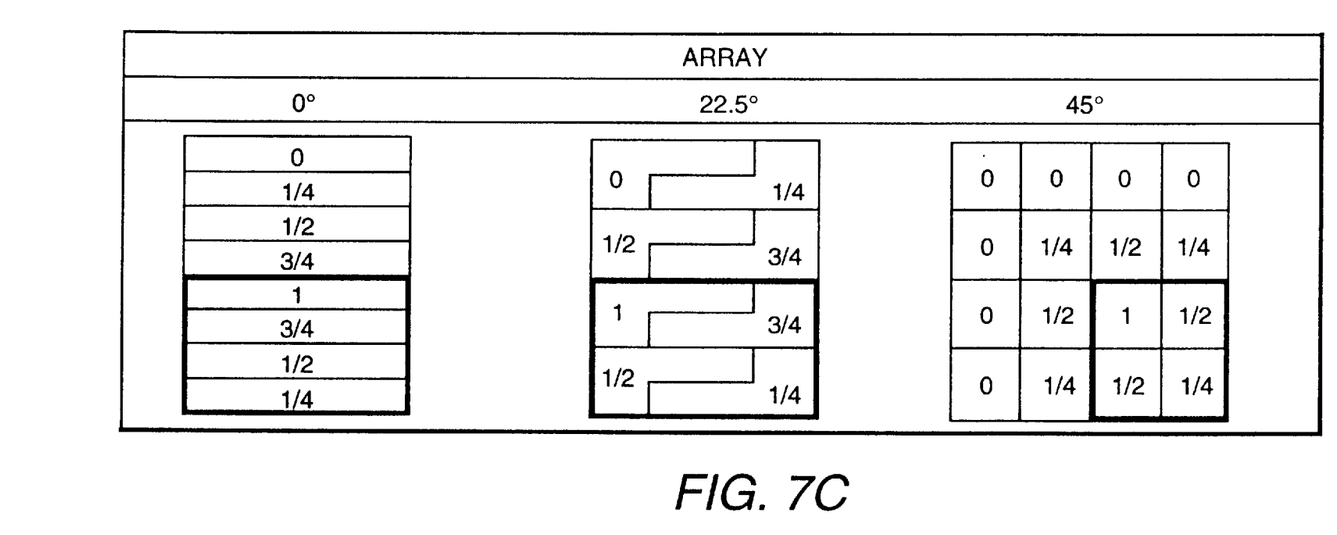
FIG. 7C is a diagram showing the preprocessor filter weights in accordance with the preferred embodiment of the invention.
Figure 7D:
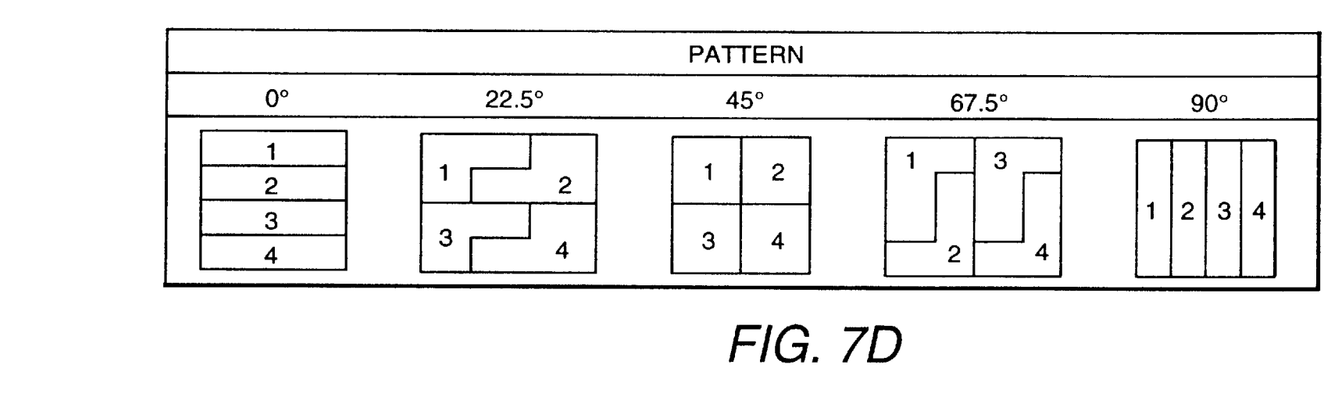
FIG. 7D is a diagram showing the probe directional patterns in accordance with the preferred embodiment of the invention.

FIGS. 7A–7D and 8 depict an ultrasound imager that allows beams to be formed at angles in steps of 22.5°. Referring to FIG. 7A, the imager probe comprises a transducer array 20 preferably made up of 57 groups 22 of 16 transducer elements each, so that the total number of transducer elements in array 20 is 912. The patterns required for the various beamforming directions are shown in FIG. 7D. These patterns, from left to right, respectively correspond to beam angles of 0°, 22.5°, 45°, 67.5° and 90° measured from the vertical.

Figure 8:
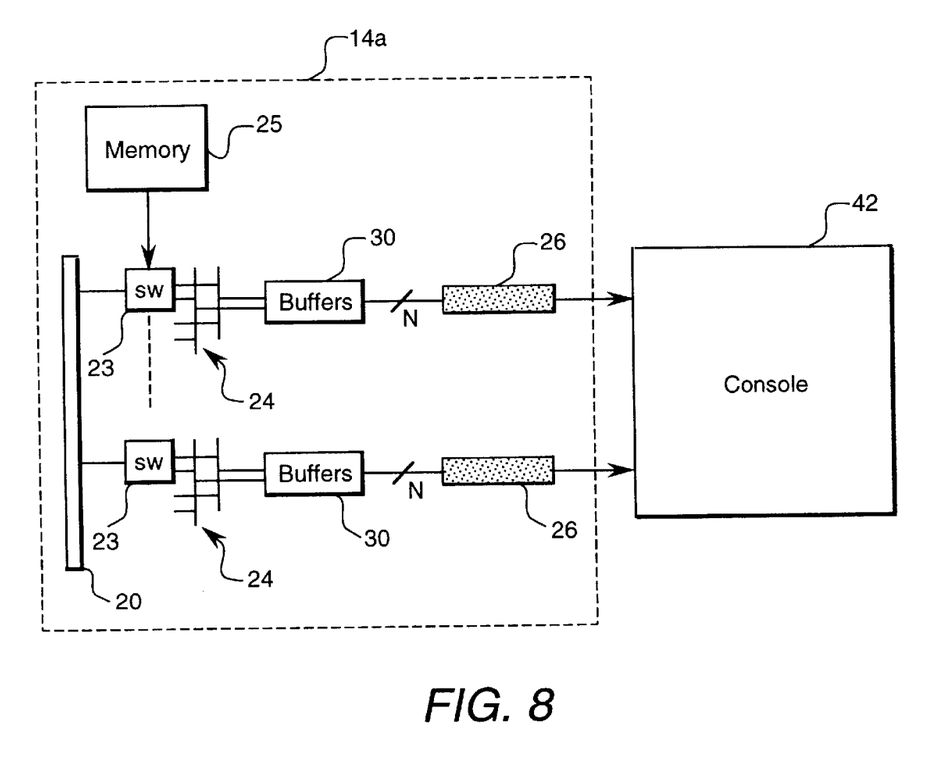
FIG. 8 is a block diagram of a probe switched transducer group within a array in accordance with the preferred embodiment of the present invention.

Four local busses 24 are incorporated in probe group 14a (see FIG. 8). Each one of the four local busses 24 is served by a respective one of a plurality of coaxial cables 26 coupled to the probe. Therefore, while the entire array comprises 912 transducer elements, only 228 local busses with their 228 coaxial cable connections are required. As indicated in FIG. 7B, this number is reduced further by the transform preprocessing section 2, which follows an analog section 28. The 57 outputs of transform preprocessor 2 are coupled to a digital beamforming apparatus 10 of conventional design. This beamforming apparatus may advantageously employ dynamic focusing, dynamic shading and apodization, on these composite signals. As previously described, transform preprocessor 2 uses spatial filtering to reduce spurious signals resulting from mismatches between the delays of the preprocessor and the final beamforming apparatus. These filters are formed by combining the signals from local busses of adjacent transform blocks, using weighting factors.

One possible set of weighting factors used to form the spatial filters for transform preprocessor 2 of FIG. 7B is shown in FIG. 7C. When the array is directed in the orthogonal directions the weights follow those used for the one-dimensional linear array described above. Filters having weights of (¼, ½, ¾, 1, ¾, ½, ¼) are shown on the left-hand side of FIG. 7C. The selected group of a 4×4 array of transducer elements is indicated by the boldface square. Each weighted local bus signal, from within the selected group of 16 transducer elements or from adjacent groups, is delayed by an amount required by the steering direction of the array and then added to the output signal of that group. Each group generates an output signal in similar manner using weighted signals from within the group and weighted signals contributed from adjacent groups. In total, every local bus contributes an equal weight to the total output signal. The weighting factors to be used when the array is directed at 22.5° and 45° angles are respectively shown in the center and rightmost diagrams in FIG. 7C.

FIG. 8 is a schematic depicting one overall probe transducer group 14a. Connections to array 20 are made ii the conventional manner, with one connection to each respective one of the transducer elements. The transducer elements in such group of elements are selectively connected to local busses 24 via switches 23. Each local bus provides an output signal that is sent back to the console 42 via a respective coaxial cable 26. The number of connections that are necessary to bemade through each coaxial cable is reduced by the ratio of the number of transducer elements coupled to a set of local busses, to the number of busses in that set. Each set of N local busses provides the input transform signals to one transform section 4 of transform preprocessor 2 (see FIG. 2). Buffers 30 are optionally incorporated to improve the transmission of the data from the probe 14 to the console, in which the transform preprocessor 2 and delay beamformer 10 (FIG. 7B) are housed.

Each transducer 22 for a given transform section may be operatively coupled to one of the set of associated local busses 24 for the given transform section. Which connection is made is determined by a control signal stored in memory 25. The code pattern of the memory therefore specifies the patterns of the transducer element open connections to the coaxial cables. In effect, the memory pattern determines to which of the local busses each transducer element contributes its signal. The pattern stored in the local control memory therefore determines the direction of the spatial filter of each local region of the transducer array.

Figure 9:
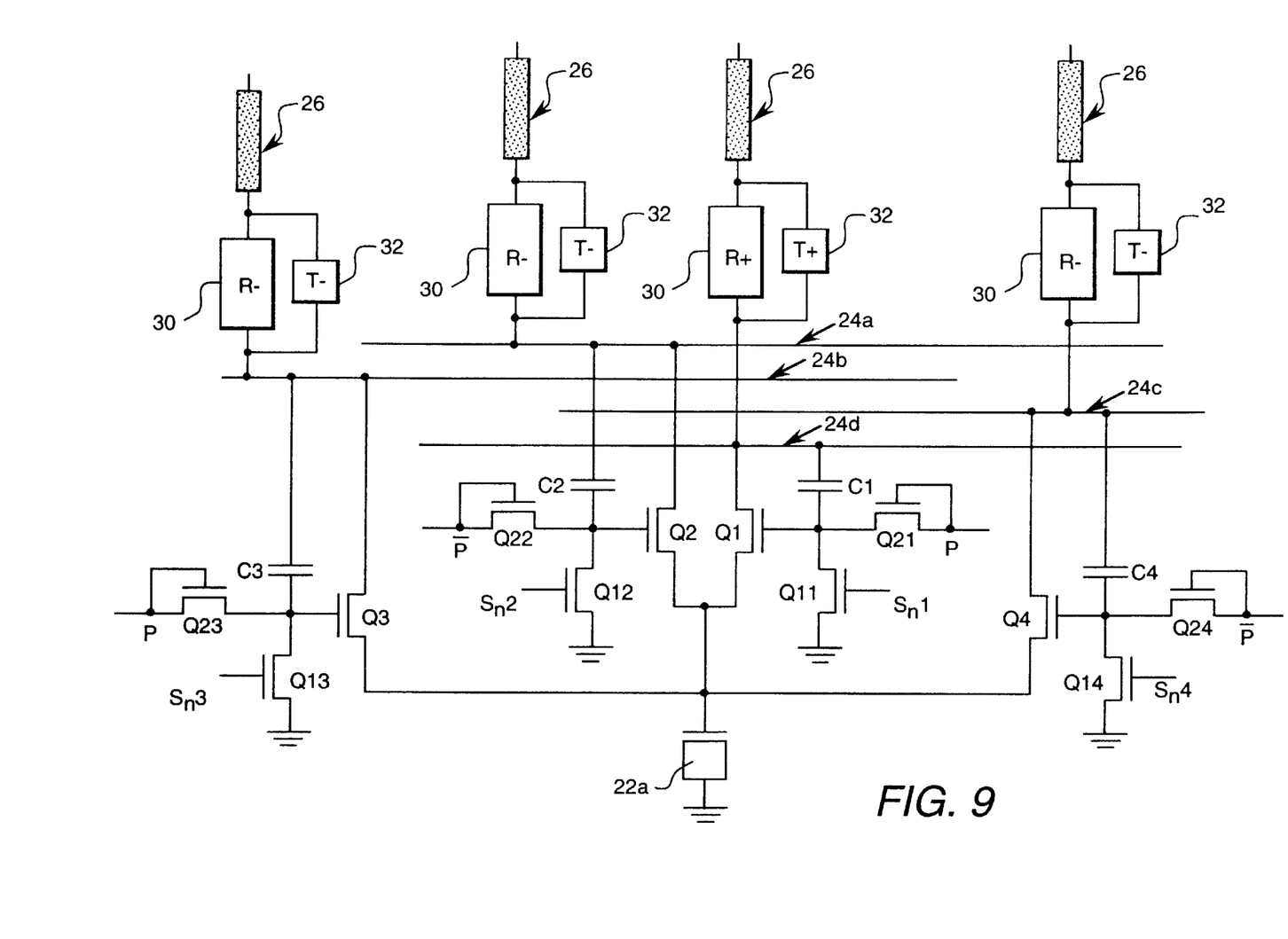
FIG. 9 is a circuit diagram showing a high-voltage switching circuit in accordance with the preferred embodiment of the invention.

FIG. 9 shows more detail of the selective coupling of each of the transducer elements to its local bus. For simplicity, FIG. 9 shows the connection of one of transducer elements 22a to a selected one of four local busses 24a–24d. The number of these busses in the actual configuration depends on the order N of the transform that is desired. FIG. 9 shows schematically a portion of an integrated circuit suitable for coupling selected transducer elements to the local busses and also shows an optional buffer 30 and transmission bypass 32, which may form part of the same chip.

In accordance with a preferred embodiment of the invention, pulses are sent through each cable 26 to its associated local bus during the transmission portion of the imaging cycle. The pulses are applied to each transducer 22a by the same switching circuit that couples the transducer to the local bus during the receive portion of the cycle. High-voltage NMOS switching transistors Q1 through Q4 provide connection for local transducer element 22a and provide isolation for other elements during both transmission and reception portions of the imaging cycle. Switching transistors Q1 through Q4 have their gate nodes bootstrapped by capacitors C1 through C4, respectively, to enable the full voltage pulse of the transmit signal pulse to be received at the transducer. The overall pulse timing of the set of signals sent through cables 26 to the local busses determines the steering direction of the transmission by directing the transmitted beam at a specified angle, in a plane in the azimuthal direction specified by the pattern of the local bus connections. The architecture of the structure of FIGS. 8 and 9 thus functions in two dimensions in both the transmission and reception modes of the ultrasonic signals.

During reception of the signals, each transducer is coupled to its associated buffer amplifier cable. Transistors Q21 through Q24 allow all of the gate nodes of transistors Q1 through Q4 to be precharged prior to their selection and prior to the firing of the transducer pulses. This is accomplished by a gate pulse P. Transistors Q11 through Q14 discharge to ground all unselected nodes. Selection signals $S_n1$ through $S_n4$ applied to the gates of transistors Q11 through Q14 determine the nodes to be discharged. These nodes are held at ground potential throughout the remainder of the cycle, preventing leakage of the high-voltage pulse to the gates of unselected pass devices. Transistors Q11 through Q14 therefore provide high-voltage isolation to prevent the high-voltage transmission pulse from interfering with the remainder of the circuit, while also specifying the connection pattern used during the receive portion of the cycle as the associated nodes of the pattern are left charged during that time.

Figure 10:
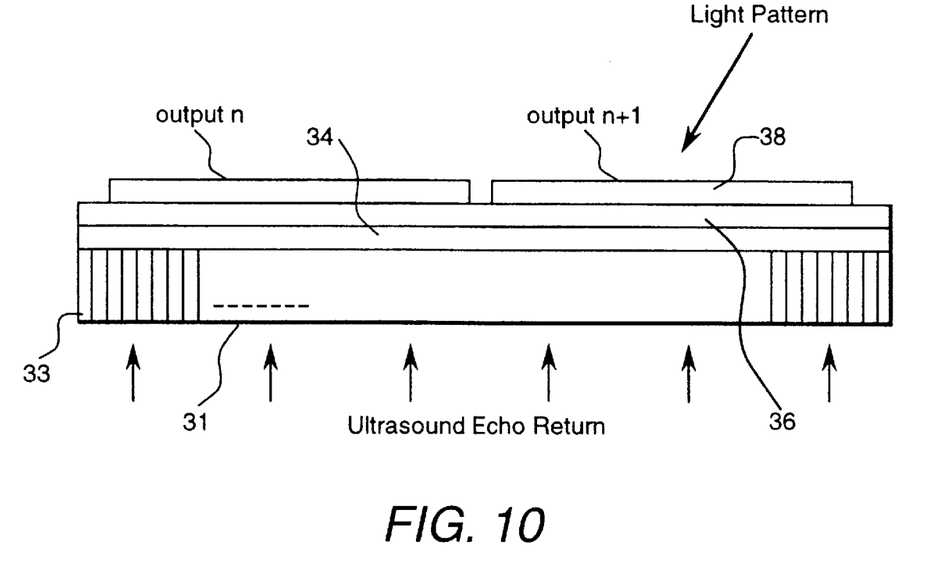
FIG. 10 is a schematic diagram of the structure of an optically switched transducer array in accordance with an alternative preferred embodiment of the invention.

FIG. 10 shows a cross section of an alternative preferred embodiment of probe which utilizes optical switching. This probe comprises a layer of piezoelectric ceramic material 31 diced into an array of transducer elements 33, an electrically conductive backing layer 34, a layer 36 of photoconductive material bonded to the backing layer, and an array of optically transparent signal electrodes 38. Although not indicated in the drawing for the sake of simplicity and clarity, the backing layer and the photoconductive layer are diced along with the piezoelectric ceramic layer in conventional fashion to form a plurality of laminated elements. These laminated elements are segregated into groups, each group being associated with a respective signal electrode. When light is directed onto a selected photoconductor, the photoconductor electrically couples the associated transducer element to the signal electrode. In the absence of impinging light, the transducer elements remain uncoupled. By forming a selected optical pattern on the photoconductor array, selected transducer elements in a particular group can be coupled to the associated signal electrode. This forms an array of spatial transforms having quantized coefficient values of 1 and 0, similar to a Fresnel plate. The transform pattern is selected to enhance the signals arriving from a selected direction and to reject signals from other directions. This process is duplicated for each group of transducer elements.

The signal on each of the optically transparent signal electrodes is the transform beam space output signal of the local array or group of transducer elements served by that signal electrode. No additional multiplexing is necessary. A zero-order inverse transform of that output signal is simply the same signal. It may therefore be sent directly to one channel of a time-delay beamformer, preferably a digital baseband beamformer of conventional type. The functions performed by FIG. 1 can therefore be satisfied by the relatively simple structure shown in FIG. 10.

Figure 11:
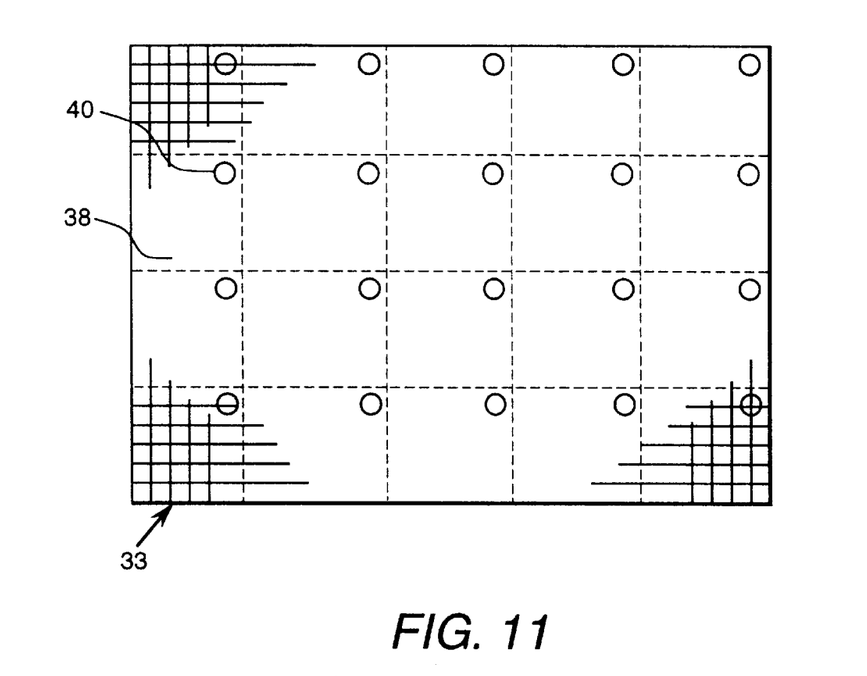
FIG. 11 is schematic diagram of a section of a two-dimensional optically switched transducer array in accordance with the alternative preferred embodiment shown in FIG. 10.

FIG. 11 shows a section of a probe having a two-dimensional array of transducer elements 33, indicated by solid lines. The optically transparent signal electrodes 38 are indicated by dashed lines. Each electrode 38 has a contact 40. A pattern of light specifies both the kx and ky spatial directions at each transform location.

More efficient but also somewhat more complex transform structures are possible. For example, additional busses may be obtained by incorporating additional optically transparent signal electrodes. Interdigitated electrodes may be used to provide access to each transducer element of the group by two local busses. Light then couples a respective transducer element to either one electrode or the other. This produces a pair of signals that utilize all of the transducer elements. Similarly, the structure may be expanded to provide four local busses, with optical signals used to connect each element to one of four electrodes. The connection patterns of FIG. 7D are used to provide the previously-described beam directions.

Although the photoconductive layer shown in FIG. 10 provides selective interconnections of the transducer elements, other alternative methods of employing the light signal to control the interconnections are possible. For example, photodiodes and switching transistors that more fully differentiate between the desired on and off states may be utilized.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. An ultrasonic probe comprising:

a plurality of groups of transducer elements, each transducer element comprising a respective signal electrode;

a plurality of groups of cable electrical conductors, the number of cable electrical conductors in each group of cable electrical conductors being less than the number of transducer elements in each group of transducer elements and the number of groups of cable electrical conductors being equal to the number of groups of transducer elements;

a plurality of groups of local busses, the number of local busses in each group of local busses being equal to the number of cable electrical conductors in each group of cable electrical conductors and the number of groups of local busses being equal to the number of groups of cable electrical conductors, and each local bus in a group of local busses being electrically coupled to a respective cable electrical conductor of a respective group of cable electrical conductors; and a plurality of groups of switching elements, the number of switching elements in each group of switching elements being equal to the number of local busses in each group of local busses and the number of groups of switching elements being equal to the number of transducer elements, each switching element of a particular group of switching elements being selectively operable to electrically couple a signal electrode of a particular transducer element to a selected respective local bus of a respective group of local busses.

2. The ultrasonic probe of claim 1, wherein each of said switching elements comprises a transistor.

3. The ultrasonic probe of claim 1, further comprising a plurality of buffers, each respective one of said buffers being coupled in series between a respective local bus and a respective cable electrical conductor.

4. The ultrasonic probe of claim 3, further comprising a plurality of transmission bypass paths, each respective one of said transmission bypass paths serving to electrically couple a junction between a respective buffer and a respective cable electrical conductor to a junction between said respective buffer and a respective local bus during a transmission mode.

5. The ultrasonic probe of claim 1, wherein said switching elements are adapted to be enabled in accordance with a predetermined pattern corresponding to a desired beam direction.

6. The ultrasonic probe as defined in claim 1, wherein said switching elements comprise optically controlled elements.

7. The ultrasonic probe of claim 6, wherein each local bus comprises an optically transparent electrode.

8. An ultrasonic imaging system comprising:

an ultrasonic probe including a plurality of transducer elements;

a console including a spatial filtering preprocessor and a time delay beamformer;

a plurality of cable electrical conductors for coupling signals from said probe to said spatial filter preprocessor;

means for coupling spatially filtered signals from said preprocessor to said time delay beamformer, said beamformer comprising a plurality of channels, said plurality of transducer elements being greater in number than the number of said plurality of cable electrical conductors, and the plurality of cable electrical conductors being greater in number than the plurality of channels;

a plurality of local busses being equal in number to the number of the plurality of cable electrical conductors, each respective one of said local busses being electrically coupled to a respective one of said plurality of cable electrical conductors; and a plurality of groups of switching elements, the number of groups of switching elements being equal to the number of the plurality of transducer elements, each respective one of said groups of switching elements being coupled to a respective one of the plurality of transducer elements, the switching elements of any particular group of switching elements being selectively operable to electrically couple the respective one of the plurality of transducer elements to a selected respective one of a plurality of local busses.

9. The ultrasonic imaging system of claim 8, wherein each of said switching elements comprises a transistor.

10. The ultrasonic imaging system of claim 8, further comprising a plurality of buffers, each respective one of said buffers being coupled in series between a respective local bus and a respective cable electrical conductor.

11. The ultrasonic imaging system as defined in claim 10, further comprising a plurality of transmission bypass paths, each respective one of said transmission bypass paths serving to electrically couple a junction between a respective buffer and a respective cable electrical conductor to a junction between said respective buffer and a respective local bus during a transmission mode.

12. The ultrasonic imaging system of claim 8, wherein said switching elements are adapted to be enabled in accordance with a predetermined pattern corresponding to a desired beam direction.

13. The ultrasonic imaging system of claim 8, wherein said switching elements are optically controllable and each local bus comprises an optically transparent electrode.

14. An ultrasonic probe comprising:

a transducer element having a signal electrode;

a plurality of cable electrical conductors;

a plurality of local busses, each one of said local busses being electrically coupled to a respective one of said cable electrical conductors; and a plurality of switching elements, each one of said switching elements being selectively operable to electrically couple the signal electrode of said transducer element to a selected respective one of said plurality of local busses.

15. The ultrasonic probe of claim 14, wherein each of said switching elements comprises a transistor.

16. The ultrasonic probe of claim 14, wherein said switching elements comprise optically controlled elements.

* * * * *